July 26, 1949.                    H. W. GARBE                    2,477,332
                          ARTICLE ASSEMBLING APPARATUS
Filed Jan. 7, 1944                                            2 Sheets-Sheet 1
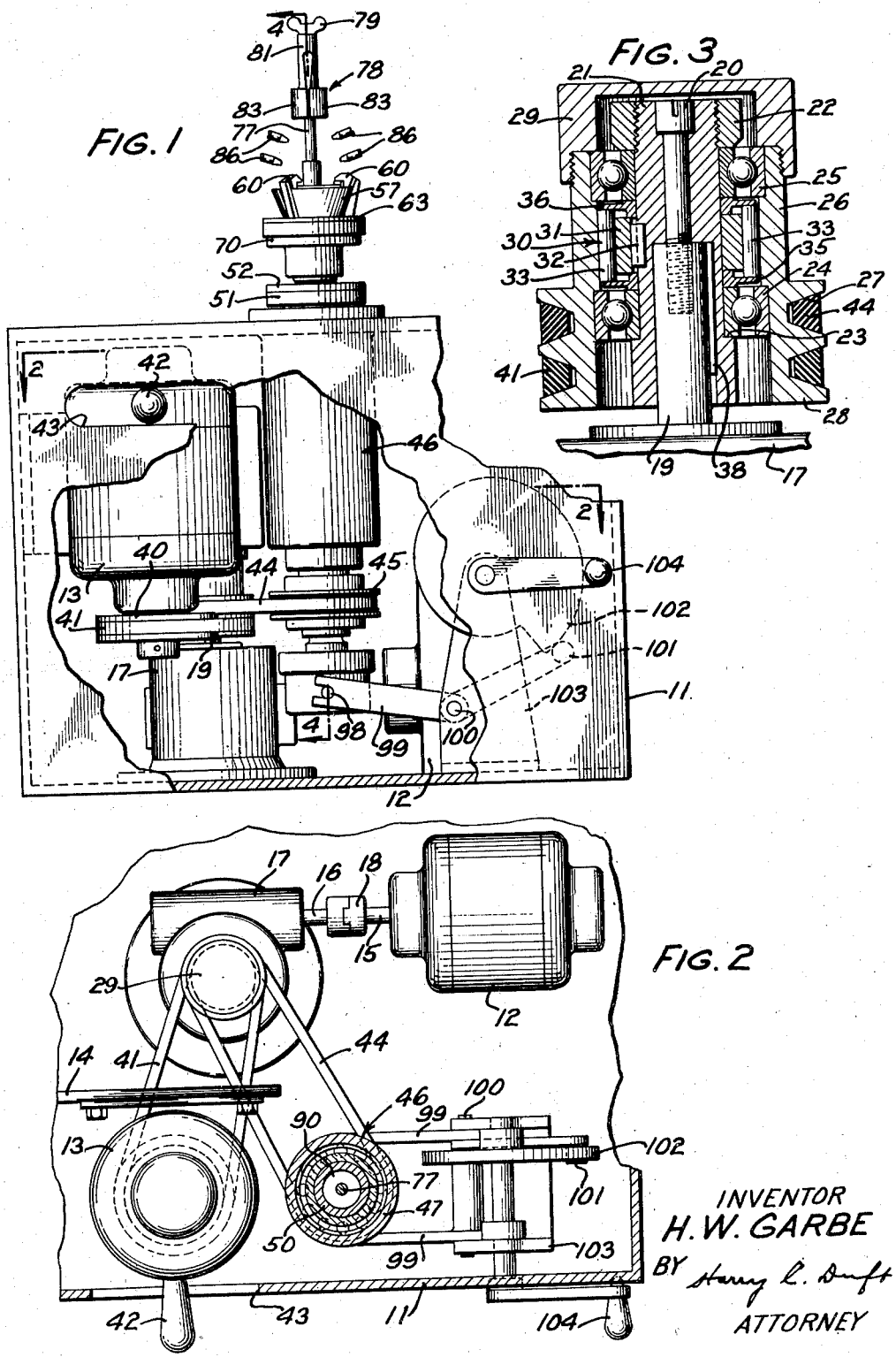
INVENTOR
H. W. GARBE
BY
ATTORNEY July 26, 1949.  H. W. GARBE  2,477,332
ARTICLE ASSEMBLING APPARATUS
Filed Jan. 7, 1944  2 Sheets-Sheet 2
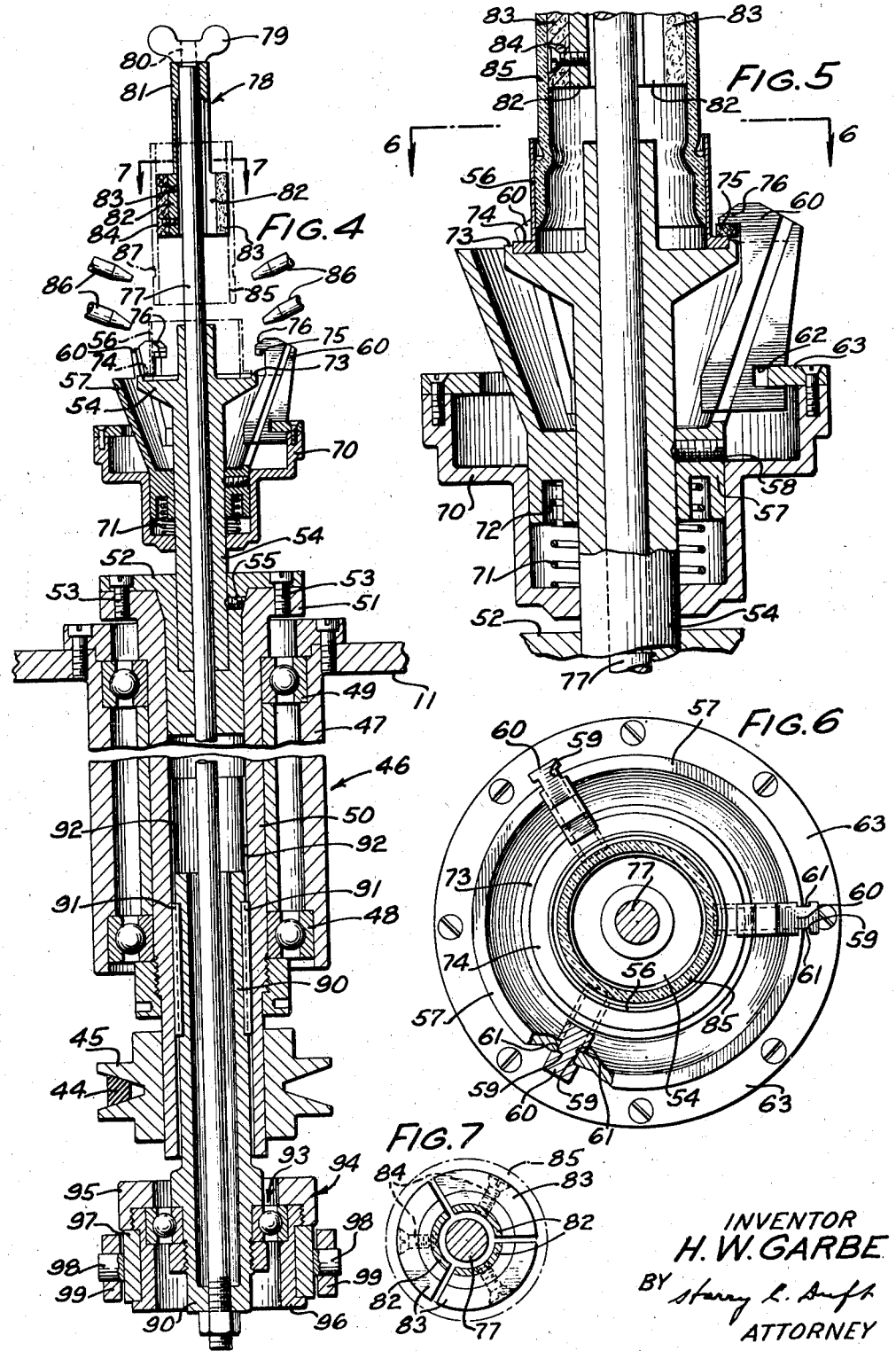
INVENTOR
H. W. GARBE
BY
ATTORNEY Patented July 26, 1949

2,477,332

UNITED STATES PATENT OFFICE 2,477,332

ARTICLE ASSEMBLING APPARATUS

Howard W. Garbe, Hinsdale, Ill., assignor to Western Electric Company, Incorporated, New York, N. Y., a corporation of New York Application January 7, 1944, Serial No. 517,378

2 Claims. (Cl. 49—1)

This invention relates to article assembling apparatus and more particularly to an apparatus for assembling a tubular metallic element to a tubular glass element.

In the manufacture of some types of vacuum tubes, it is desirable to seal the glass envelope or a tubular portion of the envelope to a metallic base member in such a manner that the probability of leakage between the metal and glass will be reduced to the absolute minimum.

It is an object of the present invention to provide a simple apparatus for rapidly assembling articles.

In accordance with one embodiment of the invention, a pair of motors is provided for driving a spindle, one of the motors driving a speed reducer, on the output shaft of which there is mounted an overrunning clutch, the overrunning portion of which is adapted to be driven by the second motor and the second motor is provided with a speed control device whereby its output speed may be varied at the will of the operator. The overrunning clutch, in turn, drives the spindle, which carries a pair of article-supporting devices or chucks on a common axis and slidably arranged to telescope the articles one within the other, whereby, when the variable motor is used to drive the spindle, high speed rotation may be imparted to both of the parts being assembled while they are held in telescoping relation, thereby to cause one of the parts, which has been partially plasticized by heating it, to be thrown outwardly by centrifugal force and into tight engagement with the other part, which has also been heated, but which is made of a material having a higher melting point and which will, therefore, not be plasticized, but will be heated to facilitate the attachment of the parts one to another.

A complete understanding of the invention may be had by reference to the following detailed description when considered in conjunction with the accompanying drawings, wherein Fig. 1 is a side elevational view of apparatus embodying the invention;

Fig. 2 is a plan section taken substantially along the line 2—2 of Fig. 1 in the direction of the arrows;

Fig. 3 is an enlarged fragmentary vertical sectional view taken through the overrunning clutch;

Fig. 4 is a vertical sectional view taken substantially along the line 4—4 of Fig. 1 in the direction of the arrow showing details of the spindle and the means for holding the glass and metal tubes, parts being broken away to conserve space;

Fig. 5 is an enlarged fragmentary sectional view taken through the spindle and showing the chuck mechanism for holding the metallic tube during the rotation thereof;

Fig. 6 is an enlarged detail section view taken substantially along the line 6—6 of Fig. 5 in the direction of the arrows and looking down upon the chuck mechanism, part being broken away to show the details of construction thereof; and Fig. 7 is an enlarged fragmentary sectional view taken substantially along the line 7—7 of Fig. 4 in the direction of the arrows.

Referring to the drawings, wherein like reference characters designate the same parts throughout the several views, particular reference being first had to Figs. 1 and 2, the driving portions of the apparatus are mounted within a suitable casing 11, in which there are mounted a pair of motors 12 and 13, the motor 12 being mounted on the floor of the casing and the motor 13 being supported on a bracket 14 secured to the side walls of the casing. The motor 12 drives a shaft 15 coupled to an input shaft 16 of a speed reducer 17 by a coupling member 18. The speed reducer 17, as shown most clearly in Fig. 3, has its output shaft 19 extending vertically. The shaft 19 is threaded at its upper end to receive a machine screw 20 for holding a sleeve 21 on the upper end of the shaft 19, a key 38 engaging keyways in the sleeve 21 and shaft 19. The sleeve 21 is threaded at the upper end to receive a retainer ring 22 and is provided with a shoulder 23. Mounted between the retainer ring 22 and shoulder 23 are bearing assemblies 24 and 25, which, in turn, support a sleeve 26, on which there is formed a pair of sheaves 27 and 28. In order to prevent foreign matter from getting into the bearing assemblies 24 and 25, a cap 29 is threaded onto the upper end of the sleeve 26.

The overrunning clutch details, which may be of any suitable type, have been shown herein as an assembly designated generally by the numeral 30 and positioned between the bearing assemblies 24 and 25, the inner edges of which serve to clamp the overrunning clutch 30 between them on the sleeve 21. In addition to being held in position by the clamping action of the bearing assemblies, the inner annular friction member 31 of the overrunning clutch 30 is keyed to the sleeve 21 by means of a key 32 and will serve to force roller members 33—33 into engagement with the inner surface of the sleeve 26, when power is supplied to drive the motor 12 and when the motor 13 is not running. The roller members 33 are supported between support rings 35 and 36 to hold them in the proper position to be pinched between the friction member 31 and the sleeve 26 when the shaft 19 is driving the sheaves 27 and 28.

The motor 13 drives a pulley 40 (Fig. 1), which is interconnected with the sheave 28 by a belt 41 and when the motor 13 is supplied with power, the belt 41 will drive the sleeve 26 at a rate of speed faster than the speed of rotation of the shaft 19 and thus the motor 13 will cause the sleeve 26 to rotate freely about the shaft 19 and will cause the overrunning clutch 30 to be rendered ineffective, as is usual in such constructions. The motor 13 is a variable speed motor of any suitable type, provided with the usual controls which may be operated by means of a handle 42 which extends through a slot 43 in the casing, whereby an operator may regulate the speed of rotation of the sleeve 26 and, therefore, control the speed of rotation of the spindle, to be described hereinafter.

The sheave 27 engages and drives a belt 44, which encircles a drive pulley 45 of a spindle mechanism designated generally by the numeral 46 and shown in detail in Fig. 4, to which reference will now be had.

A spindle guiding tube 47 may be formed integrally with or suitably attached to the underside of the upper surface of the casing 11, which is apertured to receive portions of the spindle mechanism. The spindle supporting tube 47 carries bearing assemblies 48 and 49 mounted within it for rotatably supporting a sleeve 50, on which the drive pulley 45 is fixed. The upper end of the sleeve 50 is provided, as shown in Fig. 4, with an annular shoulder 51, in which a guide bushing 52 is secured by means of machine screws 53—53. The guide bushing 52 has a tubular chuck member 54 fixed to it by means of a set screw 55, which serves to support a tubular metallic tube element 56, as shown in dot and dash lines in Fig. 4.

As shown most clearly in Fig. 5, the chuck member 54 has an annular relatively funnel-shaped camming sleeve 57 attached to it by means of the set screw 58. The tapered portion of the funnel-shaped camming sleeve has a series of three slots 59—59 formed in it, the edge surfaces of which serve as ways for guiding clamping members 60—60 toward and away from the tubular chuck member 54. Each of the clamping members 60 has cam slots 61 formed on opposite sides of it for registration with the ways formed by the slots 59 and, in addition, each of the clamping members 60 has a slot 62 formed in it to cooperate with a guiding ring 63, which extends into the slots 62 and serves to move the clamping members.

The ring 63 is mounted on a cup-shaped member 70, which is, in turn, slidable on the tubular chuck member 54 and bears against the camming sleeve 57. The cup-shaped member 70 is normally urged downwardly with respect to the camming sleeve 57 by a compression spring 71, which bears in an annular groove 72 formed in the underside of the camming sleeve 57 and which bears against the base of the cup-shaped member 70, encircling the chuck member 54. In effect, the cup-shaped member 70 is thus supported by means of the ring 63 on the clamping members 60 and is normally urged downwardly by the spring 71 to draw the lamping members 60 downwardly and thus cause them to be cammed radially inwardly to clamping position, as shown in Fig. 5. The cup-shaped member 70, as shown in Fig. 4, is in its upper position and the spring 71 is compressed, thus to permit the insertion of a metallic tube element 56 on the upper surface of the tubular chuck member 54. The upper surface of the tubular chuck member 54 is provided with a retaining rim 73, inside of which a flange 74 formed on metallic tube element 56 may rest. Each of the clamping members 60 is provided with a resilient clamping element 75, which will bear against the flange 74 and which is mounted on an overhanging lip 76 of the clamping member 60.

Slidably positioned within the tubular chuck member 54, but rotatable therewith, is a rod 77, which is adapted to support a removable spring chuck, designated generally by the numeral 78. As shown in detail in Figs. 4 and 7, the spring chuck 78 is attached to the upper end of the rod 77 by means of a wing nut 79 threaded onto an upwardly extending reduced portion 80 of the rod 77. The spring chuck 78 comprises a main body portion 81, which encircles the rod 77 and has formed integrally with it three depending arms 82—82, which are enlarged at their lower ends to receive cushion members 83, which are, in turn, fixed to the arms 82 by means of machine screws 84. The arms 82 are normally biased to move radially outwardly from the rod 77 and the cushions 83 thereon are adapted to engage the inner surfaces of a tubular glass tube element 85 in position to be heated by flames projected from jets 86—86, which may be mounted in any suitable manner to supply gas flames for heating the lower end of the glass tube element 85 and for heating the metallic tube element 56. The glass tube element 85 has an annular groove 87 formed in it adjacent its bottom edge to facilitate control of the area of the glass tube, which, when it is rotated rapidly, will be thrust out into engagement with the metallic tube element 56.

The rod 77 extends through the chuck member 54 and through the sleeve 50, being coaxial with both the chuck member and the sleeve and is attached at its lower end to an inner sleeve 90, which is slidable within the sleeve 50 and is keyed to the sleeve 50 by means of the keys 91—91 riding in keyways 92—92 formed on the inner surface of the sleeve 50. At its lower end, the sleeve 90 is enlarged somewhat to receive a ball bearing assembly 93, which serves as a thrust bearing between the sleeve 90 and a support ring 94. The support ring 94 comprises cooperating threaded rings 95 and 96, which grip a trunnion supporting ring 97 having trunnions 98—98 thereon. The trunnions 98 are entered between the bifurcated ends of a lever 99. As shown most clearly in Fig. 1, the lever 99 is pivoted on a pin 100 and supports a cam roller 101 in engagement with a cam 102. The cam 102 and the pin 100 are mounted in a bracket 103 and the cam 102 may be rotated by means of a handle 104 journalled in the bracket 103 to rock the lever 99 about the pin 100 and thereby raise or lower the rod 77 while it is being rotated with the sleeve 50 and chuck member 54.

A better understanding of the apparatus may be had by reference to the following brief description of the mode of operation thereof. With both the motor 12 and the motor 13 not operating, a tubular metallic tube element 56 may be placed on the tubular chuck member 54 by raising the cup-shaped member 70 against the action of the spring 71 to thereby raise the clamping members 60 and cam them radially outwardly with respect to the tubular chuck member 54. Thereafter, the cup-shaped member 70 may be released to clamp the flange 74 of the tubular metallic tube element between the upper surface of the chuck member 54 and the clamping element 75 on the lip 76 of the clamping members 60. After the metallic tube element has thus been seated on the chuck member 54, a spring chuck 78 on which a glass tube element 85 has been mounted and is held on the arms 82, being gripped by the cushion members 83 thereon, may be fixed on the end of the rod 77 by means of the wing nut 79. The motor 12 may now be started to drive the sleeve 50 at a relatively low rate of speed through the action of the speed reducer 17, the belt 44 and spindle assembly 46. When the belt 44 is thus driven from the motor 12, the overrunning clutch sleeve 26 will be driven by the output shaft 19 of the speed reducer 17 at a relatively low rate of speed. The jets 86 may then be directed to project their flames onto both the metallic tube element 56 and the glass tube element 85. In this manner, the two tube elements will be heated while held separated, as shown in Fig. 4, being rotated between the jets 86. After the two tube elements have been heated to such a temperature that the glass tube element 85 has its lower edge, which is in the flames from jets 86, rendered slightly plastic, and the metallic tube element, which is made of copper, has been oxidized by the flames, the handle 104 may be manipulated to lower the glass tube element 85 into approximately the position shown in Fig. 5. The motor 13 may then be started to drive the spindle assembly 46 at a higher rate of speed than it was driven by the motor 12 and as determined by the setting of handle 42. The speed of the motor 13 having been preselected by manipulating the handle 42, the speed of rotation of the spindle assembly 46 will be such that the plastic lower end of the glass tube element 85 will be thrown radially outwardly by centrifugal force and into sealing engagement with the oxidized surface of the heated metallic tube element 56. Due to energization of motor 13, the sheave 28 will be driven at a faster speed than it was driven by the output shaft 19 of speed reducer 17 and the sheave 28 and sleeve 26 will, in effect, run away from the output shaft 19 due to the higher speed of rotation of the sleeve 26 and the speed of the spindle 46 may thus reach a speed where the centrifugal action takes place to force the bottom end of the glass tube element into tight engagement with the oxidized surface of the metallic tube element. Since both of the elements are heated, an air tight joint will be formed between the copper oxide formed on the metallic element and the glass to effectively seal the glass tube element 85 to the metallic tube element 56.

The glass will be thrown outwardly to engage the copper tube element 56 while the rod 77 is held slightly above its extreme bottom position and then the operator may move the handle 104 to its extreme clockwise position to move the glass tube element 85 downwardly a very short distance so that the glass will assume the shape shown in Fig. 5. After the glass and copper are in the position shown in Fig. 5, they should be held in that position for a short time to insure a complete amalgamation or mixing of the copper oxide and glass to insure a good seal between the parts.

After this soaking period, the motors may be stopped and the chuck 78, with the joined metallic and glass tubes, may be removed by manipulating the wing nut 79, whereupon a new pair of elements may be placed in the machine using a second chuck 78. The cup-shaped member 70 must be raised to release the jaws 74 when an assembly is to be removed and a new pair of elements placed in the apparatus.

What is claimed is:

1. In an assembling apparatus for tubular elements, a pair of rotatable and relatively axially movable chuck means for holding the elements to be assembled, means for heating the elements, a pair of coaxially positioned supports for supporting the chuck means, including a sleeve for supporting one of said chuck means, a rod coaxial with the sleeve for supporting the other chuck means, and a key slidably interconnecting the rod and sleeve for rotation together, manually operable means for reciprocating the rod with respect to the sleeve to move the elements held by the chucks from a spaced apart position into telescoping relation, a low speed drive for the supports, a high speed drive for the supports, and an overrunning clutch interconnecting said drives and operable to drive said supports at either high or low speed.

2. In an assembling apparatus for tubular elements, a pair of rotatable and relatively axially movable chuck means for holding the elements to be assembled, means for heating the elements, a pair of coaxially positioned supports for supporting the chuck means, including a sleeve for supporting one of said chuck means, a rod coaxial with the sleeve for supporting the other chuck means, and a key slidably interconnecting the rod and sleeve for rotation together, means for reciprocating the rod with respect to the sleeve to move the elements held by the chucks from a spaced apart position into telescoping relation, a low speed drive for the supports, a high speed drive for the supports, an overrunning clutch interconnecting said drives and operable to drive said supports at either high or low speed, and manually operable cam forming a part of the means for reciprocating said rod and operable to impart reciprocation to the rod.

HOWARD W. GARBE.

REFERENCES CITED

The following references are of record in the file of this patent:

UNITED STATES PATENTS

| Number | Name | Date |
|---|---|---|
| 1,124,386 | Bartlett | Jan. 12, 1915 |
| 1,547,478 | Whitmore et al. | July 28, 1925 |
| 1,701,758 | Mailey et al. | Feb. 12, 1929 |
| 1,844,936 | Hotchkiss | Feb. 26, 1932 |
| 1,862,856 | Johnson | June 14, 1932 |
| 1,942,042 | Zimber et al. | Jan. 2, 1934 |
| 1,951,875 | Laabs | Mar. 20, 1934 |
| 2,029,094 | De Vlieg et al. | Jan. 28, 1936 |
| 2,040,602 | Eitel | May 12, 1936 |
| 2,105,914 | Fritzsch | Jan. 18, 1938 |
| 2,271,658 | Miller | Feb. 3, 1942 |
| 2,296,347 | Hinkley et al. | Sept. 2, 1942 |
| 2,306,054 | Guyer | Dec. 22, 1942 |
| 2,350,220 | Ehret | May 30, 1944 |
| 2,374,269 | Breadner et al | Apr. 24, 1945 |

FOREIGN PATENTS

| Number | Country | Date |
|---|---|---|
| 217,716 | Switzerland | Feb. 16, 1942 |